United States Patent
Allgaier et al.

(10) Patent No.: US 10,983,494 B2
(45) Date of Patent: Apr. 20, 2021

(54) MODULAR FIELD DEVICE HAVING A DISPLAY/OPERATING DEVICE CONTAINING A RADIO MODULE AND AN INTERNAL POWER SUPPLY

(71) Applicant: VEGA GRIESHABER KG, Wolfach (DE)

(72) Inventors: Volker Allgaier, Haslach (DE); Holger Staiger, Hardt (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 15/752,156

(22) PCT Filed: Sep. 6, 2016

(86) PCT No.: PCT/EP2016/070999
§ 371 (c)(1),
(2) Date: Feb. 12, 2018

(87) PCT Pub. No.: WO2017/060018
PCT Pub. Date: Apr. 13, 2017

(65) Prior Publication Data
US 2018/0307191 A1    Oct. 25, 2018

(30) Foreign Application Priority Data
Oct. 6, 2015  (DE) .................... 10 2015 117 010.8

(51) Int. Cl.
*H02J 7/00*      (2006.01)
*G05B 19/042*    (2006.01)
(Continued)

(52) U.S. Cl.
CPC ....... *G05B 19/0423* (2013.01); *H01R 9/2608* (2013.01); *H01R 13/514* (2013.01);
(Continued)

(58) Field of Classification Search
CPC combination set(s) only.
See application file for complete search history.

(56) References Cited

U.S. PATENT DOCUMENTS 6,023,254 A  *  2/2000  Johnson ................ G06F 1/1616
                                                  345/32
7,893,564 B2 *  2/2011  Bennett .................. H02J 17/00
                                                  307/104

(Continued)

FOREIGN PATENT DOCUMENTS

AT        510658 A1     5/2012
DE   102006062476 A1    7/2008
(Continued)

OTHER PUBLICATIONS

GPTO search report for related application 102015117010.8, dated Jun. 23, 2016.
(Continued)

*Primary Examiner* — Arun C Williams
(74) *Attorney, Agent, or Firm* — William Gray Mitchell

(57) ABSTRACT

A modular field device comprising a housing, sensor and an electronics unit arranged in the housing, and comprising a display and/or operating unit that can be releasably connected to the electronics unit, said display and/or operating unit having a radio module for wireless communication with at least one other unit and an internal power supply, particularly a battery or rechargeable battery for at least partially supplying power to the radio module.

14 Claims, 1 Drawing Sheet

(51) Int. Cl.
*H01R 9/26* (2006.01)
*H01R 13/514* (2006.01)

(52) U.S. Cl.
CPC .............. *G05B 2219/25314* (2013.01); *G05B 2219/25428* (2013.01); *G05B 2219/33192* (2013.01)

(56) References Cited

U.S. PATENT DOCUMENTS

| | | | | |
|---|---|---|---|---|
| 2005/0134213 A1* | 6/2005 | Takagi | ................. | H02J 7/0054 320/108 |
| 2010/0181961 A1* | 7/2010 | Novak | .................... | H02J 7/025 320/108 |
| 2016/0380464 A1* | 12/2016 | Chin | ....................... | H02J 7/025 320/108 |

FOREIGN PATENT DOCUMENTS

| | | | |
|---|---|---|---|
| DE | 102007048476 | A1 | 4/2009 |
| DE | 102008037195 | A1 | 2/2010 |
| DE | 102011118310 | A1 | 5/2012 |
| DE | 102013114195 | A1 | 12/2013 |
| DE | 102013106098 | A1 | 12/2014 |
| EP | 1519336 | A2 | 3/2005 |
| EP | 1655645 | A2 | 5/2006 |
| EP | 2233994 | A2 | 9/2010 |

OTHER PUBLICATIONS

International Search Report for related application PCT/EP2016/070999, dated Nov. 8, 2016.
CPO Office Action issued for parallel office action 201680052174 dated Jun. 12, 2020.
Design of Military Wireless Sensor Network; Mingli He, Xiquan Fan, Gangfeng Liu, et al., National Defense Industry Press, Apr. 2015.
CPO Office Action issued for parallel office action 201680052174 on Jan. 8, 2021.

\* cited by examiner

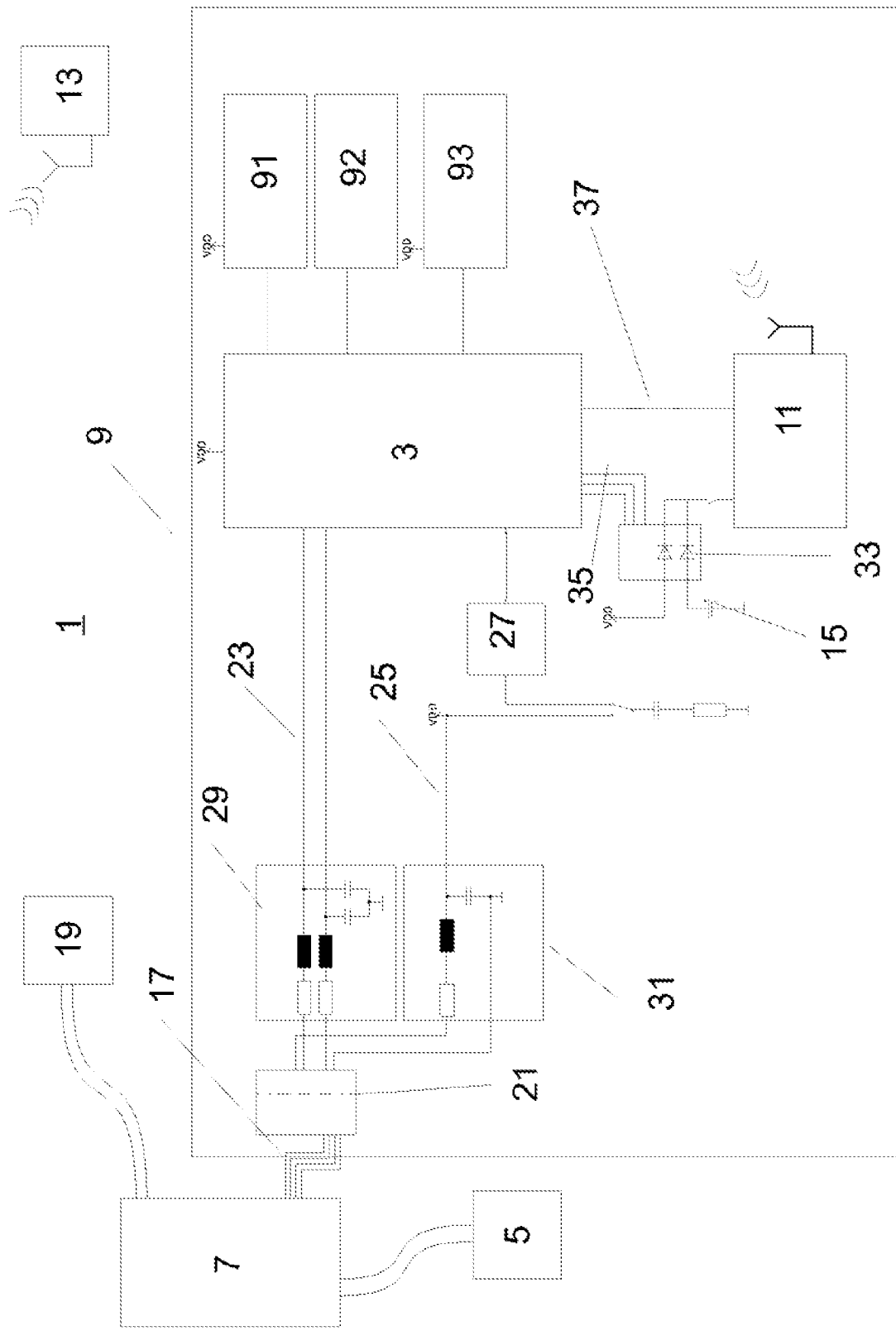

MODULAR FIELD DEVICE HAVING A DISPLAY/OPERATING DEVICE CONTAINING A RADIO MODULE AND AN INTERNAL POWER SUPPLY

STATEMENT REGARDING FEDERALLY SPONSORED RESEARCH OR DEVELOPMENT

No federal government funds were used in researching or developing this invention.

CROSS REFERENCE TO RELATED APPLICATIONS

This patent application claims priority to International Patent Application PCT/EP2016/070999, filed on Sep. 6, 2016, and thence to German Patent Application 102015117010.8, filed Oct. 6, 2015.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a modular field device as well as a modular field device system.

In process automation technology frequently field devices are used, which serve to record and/or influence process variables. Examples for such field devices are fill level sensors, limit sensors, and manometers with sensors detecting the respective process variables fill level, limit, or pressure. Frequently such field devices are connected to superordinate units, for example control systems or control units. These superordinate units serve for process control, process visualization, and/or process monitoring.

The energy and/or signal transmission between the field device and superordinate units occur frequently according to the 4 mA to 20 mA standard of prior art, in which a 4 mA to 20 mA current loop and/or a two-wire line is formed between the field device and the superordinate unit. In addition to the analog transmission of signals there is the option that the measuring devices transmit other information according to different other protocols, particularly digital protocols, and receive such information therefrom. Examples to be mentioned here are the HART-protocol or the Profibus-PA protocol.

Energy supply to these field devices occurs also via the 4 mA to 20 mA power signal, so that in addition to the two-wire line no additional current loop is required.

In order to keep the wiring and installation expense as well as the safety measures as low as possible, for example during use in areas subject to protection from explosion, it is not desired to provide additional power supply lines.

From prior art for example operating units are know which are connected physically to the 4 mA to 20 mA current loop for communicating with the field device in order to this way allow the operation of the field devices via the 4 mA to 20 mA current loop using the HART-protocol.

Such operating units are disadvantageous in that, as already mentioned, a physical connection to the 4 mA to 20 mA current loop must be established. For this purpose the two-wire line is modified such, for example isolated and/or severed, so that the operating unit can be connected. This represents a relatively high expense and cannot always be easily implemented on site.

It is further known from prior art to use radio modules for an easier operation of field devices. Here, solutions are known in which the field devices show integrated radio modules, radio modules to be retrofitted or arranged in a transducer feeding unit, a device for the energy supply of the field devices. In particular in the variants with an integrated radio module or with a radio module to be retrofitted the problem exists in prior art that with an energy supply using the 4 mA to 20 mA current loop only extremely low capacities are available and the energy that can be supplied via the current loop is sometimes insufficient to simultaneously supply the radio module, the electronic unit, and the sensor with sufficient energy so that operation is hardly possible or not at all.

For this purpose solutions are known in prior art in which the radio module is provided with a separate external energy supply.

Further, modular field devices are known from prior art in which from a plurality of sensors, housings, electronic units, and operating and/or display units a selection can be made and a respective field device be assembled. Such a modular concept for a field device is offered by the company Vega Grieshaber KG, for example. Usually, a sensor, a respective electronic module that provides measurement processing and an interface for controlling and perhaps a field bus used, as well as various display and/or operating units can be combined here. The sensors, electronic modules, and display units and/or operating units are both adjusted to each other as well as to different housings available.

In such field devices a radio module is necessary for the wireless transmission of measurements and/or operating information to the mobile operating and/or display devices.

As already shown, interfaces are provided to various field buses in the electronic unit, which however are different from one sensor to another.

The objective of the present invention is to expand a modular field device by a radio module such that it can be integrated in an existing series with as little expense as possible.

BRIEF SUMMARY OF THE INVENTION

In a preferred embodiment, a modular field device (1) with a housing, a sensor (5), and an electronic unit (7) arranged in a housing, as well as a display or operating unit (9) that can be detachably connected to an electronic unit, characterized in that the display and/or operating unit (9) comprises a radio module (11) for the wireless communication with at least one other unit (13) and an internal energy supply (15) for at least partially supplying the radio module (11) with energy.

In another preferred embodiment, the field device (1) as described herein, characterized in that the internal energy supply is embodied as a battery or a rechargeable battery or as an energy harvester.

In another preferred embodiment, the field device (1) as described herein, characterized in that the display or operating unit (9) is connected via a data line (17) to the electronic unit (7) in a wired fashion.

In another preferred embodiment, the field device (1) as described herein, characterized in that the display or operating unit (9) is connected exclusively in a wireless fashion to the other unit (13).

In another preferred embodiment, the field device (1) as described herein, characterized in that the electronic unit (7) is connected to the superordinate unit (19) in a wired fashion.

In another preferred embodiment, the field device (1) as described herein, characterized in that the display or operating unit (9) is designed such that in the event a charge status of the battery (15) or the rechargeable battery (15) is fallen short it generates and transmits a warning message.

In another preferred embodiment, the field device (1) as described herein, characterized in that the display or operating unit (9) is embodied such that it transmits a warning message via the electronic unit (7) to the superordinate unit (19).

In another preferred embodiment, the field device (1) as described herein, characterized in that the radio module (11) is deactivated when the supply of the radio module (11) is no longer ensured by the internal energy supply (15).

In another preferred embodiment, the field device (1) as described herein, characterized in that the display or operating unit (9) signals a separation of the display and/or operating unit (9) from the electronic unit (7).

In another preferred embodiment, the field device (1) as described herein, characterized in that the electronic unit (7) and the display or operating unit (9) each show a radio module (11), with the radio modules (11) being embodied such that they receive and transmit radio signals from another radio module (11).

In another preferred embodiment, the field device (1) as described herein, characterized in that at least one other unit (13) is embodied as a display or operating unit (9).

In another preferred embodiment, the field device (1) as described herein, characterized in that the internal energy supply can be exchanged.

In another preferred embodiment, the field device (1) as described herein, characterized in that the field device comprises an energy harvester, particularly a solar module, a motion energy converter, a thermal energy converter, and/or an antenna for converting electronic radiation energy to charge the rechargeable battery.

In another embodiment, a modular field device system comprising
a plurality of sensors (5)
a plurality of electronic units (7) that can be connected to the sensors (5), and
a plurality of display and/or operating units (9) that can be connected to the electronic units (7), characterized in that the field device system comprises at least one display and/or operating unit (9) with a radio module (11) for the wireless communication with at least one other unit (13), and an internal energy supply (15), particularly a battery or a rechargeable battery for at least partially supplying the radio module (11) with energy.

BRIEF DESCRIPTION OF THE DRAWINGS

FIG. 1 is a line drawing evidencing a block diagram of a field device according to the present invention.

DETAILED DESCRIPTION OF THE INVENTION

The modular field device according to the invention includes a housing, a sensor, and an electronic unit arranged in the housing, as well as a display and/or operating unit that can be detachably connected to the electronic unit, with the display and/or operating unit comprising a radio module for the wireless communication with at least one other unit and an internal energy supply, particularly a battery or a rechargeable battery, for at least partially supplying the radio module with energy.

Such a modularly designed field device allows by the arrangement of the radio module in the display and/or operating unit and the at least partial supply of the radio module with energy from an internal energy supply, for example from a battery or a rechargeable battery, the option to equip the existing field devices with a display and/or operating unit that can be detachably connected to the electronic unit, even subsequently with a radio module, which is integrated in the display and/or operating unit. This is particularly advantageous in that by an appropriate modular design of the field device usually the electronic unit is adjusted at least partially to the various sensors that can be used and therefore a plurality of different electronic units are given, however the electronic units usually form a uniform interface for the connection to a display and/or operating unit.

It is therefore no longer necessary to provide a plurality of different electronic units with and without radio modules, respectively, and allows by an additional module, namely a display and/or operating unit with a radio module, to perform a respective expansion. In order to prevent any interference with the existing energy concept of the field devices, as shown above for example communicating via a two-wire line using the 4 mA to 20 mA protocol and thus being equipped with only limited energy, it is achieved by the integration of an internal energy supply, particularly a battery or rechargeable battery, that expanding the display and/or modular unit by the radio module abstains from interfering with the existing energy concept and yet allows the operation of the radio module.

A seamless integration is allowed when the display and/or operating unit are connected via a data line, wired to the electronic unit. The display and/or operating unit may also be connected in an exclusively wireless fashion to another unit, for example a mobile display and/or operating device. This way, display and/or operating functions can be exchanged via the radio module between the additional unit and the display and/or operating unit and here for example configurations can be performed or measurements be checked.

Further, the electronic unit may be connected wired to a superordinate unit, for example with a process control or a measurement monitor. This way, particularly a power supply of the electronic unit and the sensor can occur via the wired connection, particularly via a two-wire line.

Advantageously the display or the operating unit are designed such that it generates and transmits a warning message when a predetermined charge status of the battery or the rechargeable battery is fallen short. Such a warning message can be transmitted for example via the electronic unit to the superordinate unit. For this purpose it is beneficial when the display and/or operating unit are embodied such that the warning message can be transmitted via the electronic unit to the superordinate unit.

In order to prevent any risks for functions of the field device, it is beneficial for the radio module to be deactivated when a supply of the radio module is no longer ensured by the internal power supply. This way it is prevented that due to the supply of the radio module via the energy supply of the display and/or operating unit any risks are voided to the functionality of the electronic unit or the display and/or operating unit.

In an advantageous embodiment the display and/or operating unit signal a separation of the display and/or operating unit from the electronic unit. This can occur for example by an appropriate display or an acoustic signal. This way a warning is issued, which signals for example a limited functionality of the field device.

In an alternative embodiment the electronic unit and the display and/or operating unit may each show a radio module, with the radio modules being embodied such that they receive and transmit radio signals of another radio module.

This way, a repeater functionality can be achieved, which for example when the energy and/or operating unit is arranged at a distance from the electronic unit, that can respectively forward the radio signals of other radio modules, for example other electronic units and/or other display and/or operating units. The other unit may for example also be embodied as a display and/or operating unit and particularly as a mobile end unit, for example a smart phone, tablet PC, laptop, or mobile display and/or operating unit with special functionalities.

In one embodiment the internal energy supply is embodied in an exchangeable fashion such that particularly a rechargeable battery or a battery can be exchanged.

It may additionally be advantageous for the field device to comprise an energy harvester, particularly a solar module, a motion energy converter, a thermal energy converter, and/or an antenna for converting electronic radiation energy for charging the rechargeable battery. This way, additional energy can be provided for releasing the internal energy supply and/or it can be recharged.

The invention further includes a modular field device system comprising a plurality of sensors, a plurality of electronic units that can be connected to sensors and are adjusted thereto, and a plurality of display and/or operating units that can be connected to the electronic units and are adjusted thereto, with the field device system comprising at least one display and/or operating unit, with a radio module for the wireless communication with at least one additional unit and a display and/or operating unit comprising an internal energy supply, particularly a battery or a rechargeable battery for the at least partial supply energy to the radio module.

In one such modular field device system different sensors and electronic units can be retrofitted easily with a display and/or operating unit comprising a radio module for the wireless communication with other units, particularly wireless display and/or operating units without here interfering with any existing energy concepts of the already existing field device.

Detailed Description of the Figures

FIG. 1 shows a block diagram of a modular field device 1 according to the present application.

The field device 1 comprises an electronic unit 7, which is connected to a sensor 5 for measuring a physical parameter. The sensor 5 can for example be embodied as manometer, limit sensor, or radar sensor for measuring a fill level. The electronic unit 7 is further connected to a superordinate unit 19, which for example may be embodied as stored program controls (SPC) or any other suitable control unit. For display and operation of a field device on site the electronic unit 7 is further connected via a data line 17 to a display and operating unit 9.

The electronic unit 7 comprises for this purpose an interface 21, which is embodied in the here shown modular field device concept with all display and operating unit 9 being uniform.

The display and operating unit 9 comprises in the present exemplary embodiment circuitry blocks 29, 31 for both a data line as well as energy supply for the use in the display and operating unit 9 in areas subject to explosion protection as well as for the protection from electromagnetic interference. A power supply 25 is fed via a switched capacitor via a power limit 27 of a control unit 3 to the display and operating unit 9.

The control unit 3 is further connected via a data line 23 to the circuitry block 29 to protect from explosion. Further, a display 91, a keypad 92, as well as a background illumination 93 for the display 91 are connected to the control unit 3. The control unit 3 controls in this context the display as well as the input via the keypad 92 and forwards via the data line 23 respective information to the electronic unit 7. Via another data line 37, a radio module 11 is connected to the control unit 3 for the communication with another unit 13, for example a mobile display and control unit. The radio module 11 is supplied with energy by a battery 15, ideally a diode 33 controlled via a control line 35 by the control unit 3.

Using the radio module 11, this way display and/or operating information can be exchanged with the other unit 13. Here, for example measurements can be shown on the other unit 13 or configuration information entered via the other unit 13.

When the charge status of the battery 15 falls below a predetermined threshold, a respective message can be issued by the control unit 3 via the data line 23 to the electronic unit 7 and the superordinate unit 19 connected thereto. If the energy supply of the radio module 11 is no longer ensured by the battery 15 due to insufficient charge, the operation of the radio module 11 is stopped. When the display and operating unit 9 is separated from the electronic unit 7 this fact can be detected by the control unit 3 and a respective confirmation signal can be transmitted via the radio unit 11 or for example shown in the display 91. The energy supply for this display may also occur via the battery 15.

LIST OF REFERENCE NUMBERS 1 field device
3 control unit
5 sensor
7 electronic unit
9 display and operating element
11 radio module
13 other unit
15 battery/rechargeable battery
17 data line
19 superordinate unit
21 interface
23 data line
25 power supply
27 power limit
29 explosion protection data line
31 explosion protection energy supply
33 energy supply, radio module
35 control line
37 data line
91 display
92 keypad
93 background illumination
$V_{DD}$ power supply The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A modular field device with an exterior housing, within which exterior housing are arranged a sensor, an electronic unit, and a display and operating unit arranged in an interior housing, such display and operating unit detachably connected by wire or similar electrical connection to the electronic unit, wherein the display and operating unit comprises a radio module for wireless communication with at least one other unit and an internal energy supply for partially or fully supplying the radio module with energy.

2. The field device according to claim 1, wherein the internal energy supply is embodied as a battery or a rechargeable battery or as an energy harvester.

3. The field device according to claim 1, wherein the display or operating unit is connected via a data line to the electronic unit in a wired fashion.

4. The field device according to claim 3, wherein the display or operating unit is connected exclusively in a wireless fashion to the other unit.

5. The field device according to claim 1, wherein the electronic unit is connected to the superordinate unit in a wired fashion.

6. The field device according to claim 1, wherein the display or operating unit is designed such that in the event a charge status of the battery or the rechargeable battery is low it generates and transmits a warning message.

7. The field device according to claim 6, wherein the display or operating unit is embodied such that it transmits a warning message via the electronic unit to the superordinate unit.

8. The field device according to claim 1, wherein the radio module is deactivated when the supply of the radio module is no longer ensured by the internal energy supply.

9. The field device according to claim 1, wherein the display or operating unit signals a separation of the display and operating unit from the electronic unit.

10. The field device according to claim 6, wherein the electronic unit and the display or operating unit each show a radio module, with the radio modules being embodied such that each receives and transmits radio signals from another radio module.

11. The field device according to claim 1, further comprising wherein at least one other unit is embodied as a display or operating unit.

12. The field device according to claim 1, wherein the internal energy supply can be exchanged.

13. The field device according to claim 1, wherein the field device comprises an energy harvester, particularly a solar module, a motion energy converter, a thermal energy converter, and/or an antenna for converting electronic radiation energy to charge the rechargeable battery.

14. A modular field device system comprising
a plurality of sensors,
a plurality of electronic units that can be connected to the sensors, and
a plurality of display and/or operating units that can be connected to the electronic units,
wherein the field device system comprises at least one display and operating unit with a radio module for the wireless communication with at least one other unit, and an internal energy supply, particularly a battery or a rechargeable battery for at least partially supplying the radio module with energy.

* * * * *